(12) United States Patent
Hymel

(10) Patent No.: US 6,353,382 B1
(45) Date of Patent: Mar. 5, 2002

(54) MESSAGE CONTROL METHOD IN A TWO-WAY COMMUNICATION SYSTEM

(75) Inventor: James Allen Hymel, Lake Worth, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/184,691

(22) Filed: Nov. 2, 1998

(51) Int. Cl.[7] ................................................. H04Q 1/00
(52) U.S. Cl. ....................... 340/7.21; 340/7.29; 370/471
(58) Field of Search ............................. 340/7.21, 7.23, 340/7.29, 825.22; 370/471

(56) References Cited

U.S. PATENT DOCUMENTS 4,691,314 A * 9/1987 Bergins ........................ 370/471
5,487,100 A   1/1996 Kane .......................... 340/7.23
5,555,446 A * 9/1996 Jasinski ....................... 340/7.21

* cited by examiner

Primary Examiner—Brian A Zimmerman
(74) Attorney, Agent, or Firm—Randi L. Dulaney

(57) ABSTRACT

A method is for controlling outbound messages in a two-way communication system (100). The method includes steps of receiving (205) and storing (210) a restriction command. The steps are performed in a system controller (112). The restriction command is received from a selective call radio. The restriction command is applicable to outbound messages intended for transmission on a channel. The method also includes a step of transmitting, in which messages are transmitted on the channel that are intended for the selective call radio, according to the stored restriction command. The method includes steps that describe restriction commands for restricting messages that exceed a maximum length (505–540) and for keeping a transmission rate below a maximum value (425–465).

13 Claims, 5 Drawing Sheets

MESSAGE CONTROL METHOD IN A TWO-WAY COMMUNICATION SYSTEM

FIELD OF THE INVENTION

This invention relates to two-way communication systems in which the service of sending message to subscribers is paid for by subscribers, and in particular to techniques of controlling the cost of service in such systems

BACKGROUND OF THE INVENTION

In some types of communication systems, the cost of service for delivering messages to subscribers is paid for by the subscribers, and part of the cost is determined by the number and length of messages. Examples of these types of communication systems are most paging and cellular communication systems. With the advent of information services such as sporting event and stock market reporting services, and new means for other message originators to enter very long paging messages, such as Internet entry, the subscriber service costs have grown and some subscribers would like to control the amount of message information they get, in order to keep the cost of their service down. A technique for controlling the message length of messages transmitted to a subscriber is described in U.S. Pat. No. 5,487,100, entitled "ELECTRONIC MAIL MESSAGE DELIVERY SYSTEM," issued to Kane on Jan. 23, 1996, at cols. 7 and 8. This technique provides one method of controlling costs in such systems, but does not, for example protect against increased costs caused by the receipt of many short messages.

Thus what is needed is an improved technique for subscribers that allows cost control by subscribers in two-way communication systems in which subscribers pay for received messages.

DETAILED DESCRIPTION OF THE PREFERRED EMBODIMENTS

Figure 1:
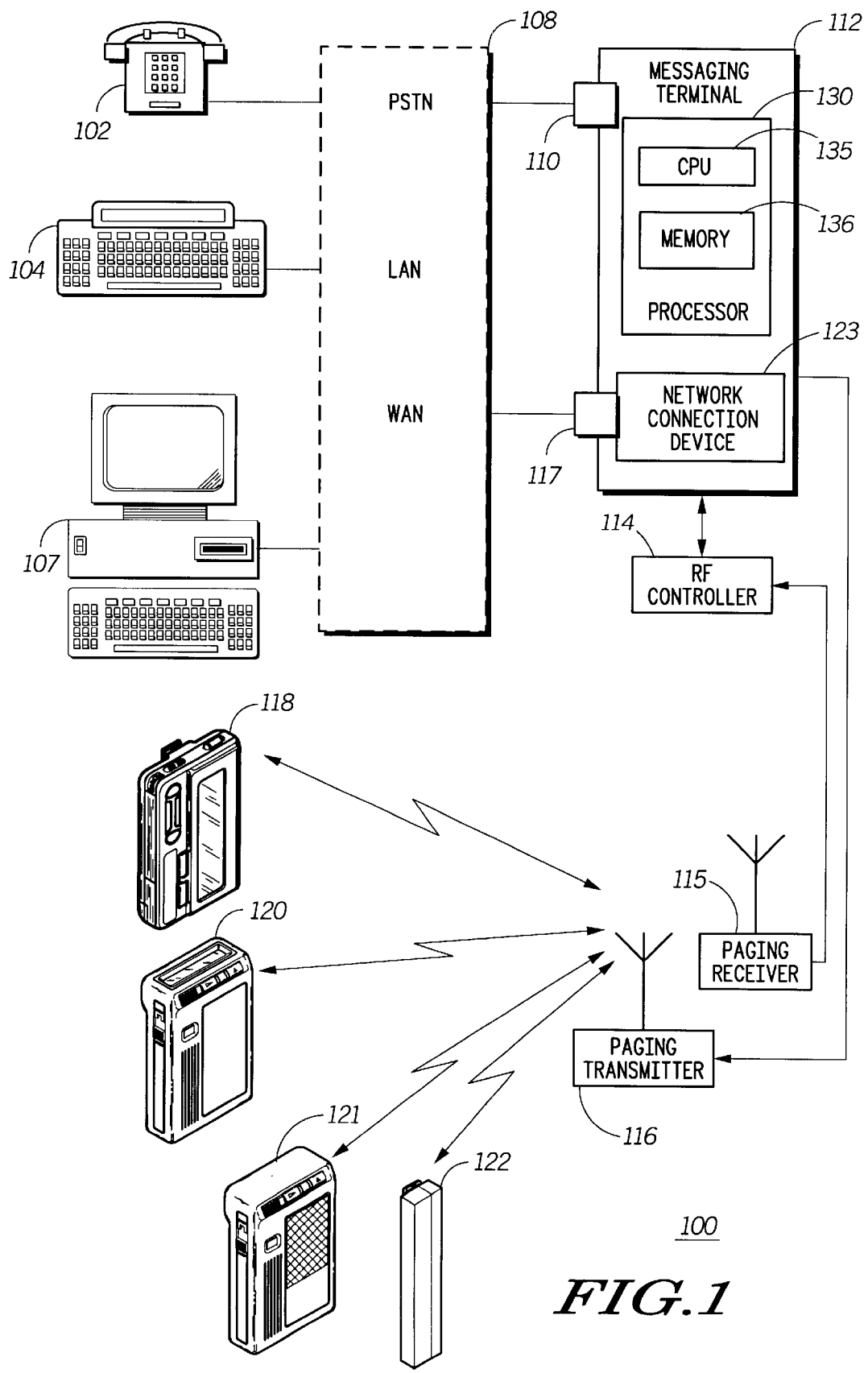
FIG. 1 shows a two-way messaging system that accepts page or messaging requests from several external sources, in accordance with the preferred embodiment of the present invention.

Referring to FIG. 1, a two-way messaging system 100 accepts page or messaging requests from several external sources, e.g. a telephone 102, a page entry device 104, and a source computer 107. The source computer 107 shown here is exemplary in nature, and can function as a messaging client, a world wide web client, an information system host, or as a world wide web host for both retrieving and serving information to other clients.

A page or messaging request is normally accepted through a telephone network input for a public or private telephone network 108 that preferably includes capabilities for connecting to a local area network (LAN) or wide area network (WAN) for effecting high speed network connections to devices such as the source computer 107. The public or private telephone network 108 couples the page request from one of the sources (i.e., voice message or computer message generators) to an automatic telephone input 110 or a network input 117 at a messaging terminal 112. The public or private telephone network 108, as well as dedicated inputs, are connected by one or more network connection devices 123 such as modems or high speed network interfaces, e.g., IEEE 802.3 or the like, supporting TCP/IP or the like connections to both the Internet and intranets.

The messaging terminal 112 comprises the network connection device 123, the automatic telephone input 110, the network input 117, and a processor 130. The processor 130 comprises a central processing unit (CPU) 135 and a memory 136. The automatic telephone input 110 provides automatic call connection of received telephone calls in a conventional manner, and couples digitized audio from a telephone call to the processor 130. The processor 130 provides a plurality of functions that run essentially concurrently as a result of the CPU 135 being controlled by a number of segments of program instructions stored in the memory 136. The memory 136 also stores tables of information. The messaging terminal 112 is preferably a WMG™ Administrator! model messaging terminal made by Motorola, Inc., of Schaumburg, Ill. that is conventional but for some unique segments of the program instructions stored in the memory 136 that are described herein, below. The memory 136 is preferably a mass memory such as a hard disk.

After accepting the page request, the messaging terminal 112 identifies a selective call radio (more generically referred to as a personal messaging device) intended to receive the page, using a number received in the request, and routes a selective call message comprising a selective call address, and possibly a canned message, to a conventional radio frequency (RF) controller 114 for transmission to the selective call radio. The selective call message is alternatively referred to as an outbound message. The outbound message is configured for a protocol, such as the well known FLEX™ protocol licensed by Motorola, Inc., by the RF controller 114, which is preferably a Conductor!™ model RF controller made by Motorola and coupled to a conventional transmitter 116, which is preferably a Symphony™ model transmitter made by Motorola, Inc. Conventional messaging systems may convey information from a caller to pager user via a plurality of outbound message formats. Each outbound message format can denote a mode of data (e.g., characters, numbers, audio, graphics, or "just a beep") being sent to the pager. The identification of the selective call address and the format to use for a particular selective call radio are determined from a subscriber database that is one of the tables stored in the memory 136. The subscriber database stores other parameters for each selective call radio, including such items as times when the selective call radio is scheduled to be available on the system, and services which the selective call radio is authorized to use.

FIG. 1 illustrates a number of personal messaging devices, alternatively called selective call radios, subscriber units, and personal messaging units, that can receive information messages from the messaging terminal 112. The personal messaging devices illustrated are an alphanumeric messaging device 118 that is a selective call radio that is of conventional design and has two-way messaging capability, a numeric display pager 120, a voice message pager, 121 and a tone only pager 122. In the later case, the tone only pager 122 (i.e., no message is presented to the user) alerts the user (e.g., by generating an audible beep) that an page originator wants the pager user to respond by calling a prearranged telephone number, such as a receptionist telephone number. Additionally, the RF controller 114 is coupled with a conventional messaging receiver 115 that operates to receive inbound signaling information (e.g., acknowledge back responses and return channel messages) from the alphanumeric messaging device 118 and route it to the messaging terminal 112. The alphanumeric messaging device 118 is preferably a Pagewriter™ two-way pager made by Motorola, Inc. of Schaumburg, Ill. which has an alphanumeric display. The messaging receiver 115 is preferably an Audience™ model receiver made by Motorola, Inc. The messaging terminal 112, the RF controller 114, the transmitter 116, and the messaging receiver 115 can alternatively be of different model and manufacture.

In the two-way messaging system 100, outbound messages are sourced from one or more source computers 107, each of which operates as an information service. An information service operates to provide information messages to many selective call radios. As an example, one type of information service provides scores of sporting events. The scores are broadcast, received, and accepted by authorized selective call radios. Another example is a selective news service that searches news stories that are of interest to a subscriber or group of subscribers. The selected news stories are broadcast, received, and accepted by authorized selective call radios. In many two-way messaging systems, the cost of service is paid for by the selective call radio subscribers. The cost for the subscriber typically comprises a fixed portion and a variable portion. The variable portion varies in accordance with the number and quantity of messages received and transmitted by the selective call radio. Although a subscriber could reduce his costs by canceling his information services, this approach is not necessary when the messaging system is designed in accordance with the preferred embodiment of the present invention. In addition, shutting off desired information services will not completely achieve the subscriber's purposes if portions of the undesired costs are due to lengthy messages that are not from information services.

Figure 2:
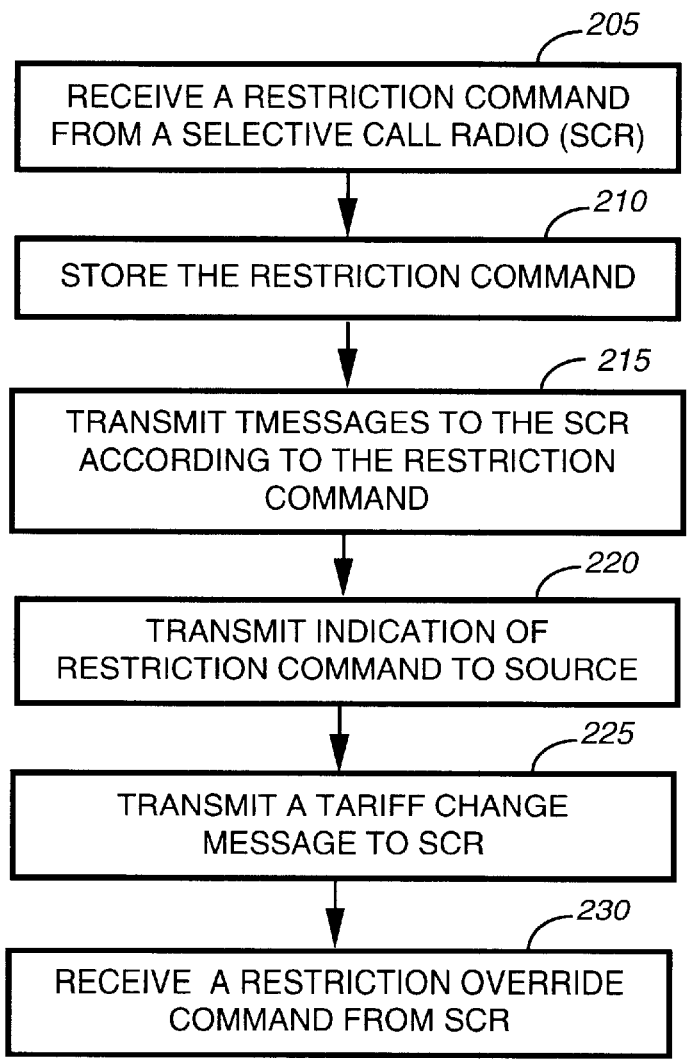
FIG. 2 shows a flow chart of a method used in the two-way messaging system, to restrict transmission of outbound messages, in accordance with the preferred embodiment of the present invention.

Referring to FIG. 2, a flow chart of a method used in the two-way messaging system 100 is shown, in accordance with the preferred embodiment of the present invention. In all cases described herein with reference to FIG. 2–6, operations of the messaging terminal 112 are performed by the CPU 135 of the processor 130, which is controlled by a unique segment of outbound messaging program instructions included in the memory 136. When a subscriber concludes that costs can be reduced by controlling outbound messages received by his two-way selective call radio, the subscriber causes his selective call radio (SCR) to generate a restriction command that is either a restriction of the length of outbound messages or a rate at which outbound messages are transmitted. In doing so, the subscriber either enters a maximum rate or length value, (depending on the type of command being generated) that is included with the restriction command, or the subscriber sends the restriction command without such maximum value included. In the latter case, a default value is used by the messaging terminal 112. In a variation of the two-way messaging system 100, subscriber-selected values are not supported and the use of the default value is required. At step 205, the restriction command is received by the messaging terminal 112, which stores the restriction command and maximum value in association with the selective call radio and the channel on which the command was received, in the subscriber database, at step 210. The maximum values are preferably converted and stored as a maximum length in characters, LENmax, and a maximum interval in seconds between messages, INTrate, although it will be appreciated that other approaches can be used equally well. At step 215, outbound messages intended for a selective call radio on a channel are normally transmitted in accordance with the most recently received restriction command from that selective call radio on the channel the restriction command was received. The details of transmitting in accordance with the restrictions are explained more fully below.

In accordance with an alternative embodiment of the present invention, the restriction command is communicated from the messaging terminal 112 to one or more of the message sources that generate messages for the selective call radio at step 220, when any of the message sources has a capability to accept and act upon such information. In this case, the messaging terminal 112 still transmits messages to the selective call radio in accordance with the messaging restriction, as doing so is simply redundant, and because the restrictions are still needed when more than one source generates messages for the selective call radio.

In accordance with a second alternative embodiment of the present invention, the two-way messaging system operates with at least two versions of tariff structures that are identifiable to the subscribers. The two-way messaging system 100 identifies when the tariff structure is being changed by sending a tariff change message to the selective call radio at step 225. Upon determining that a tariff structure has been put in place that is more beneficial, the subscriber causes the selective call radio to send in a restriction override command. When the messaging terminal receives the restriction override command at step 230, the messaging terminal 112 temporarily removes the restrictions heretofore placed. The override is effective until the tariff structure again changes, away from the beneficial version. While the override command is effective, the messaging terminal 112 sends outbound messages without any restrictions imposed at step 215.

Figure 3:
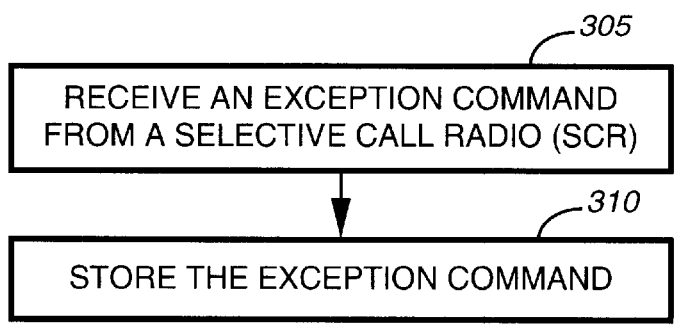
FIG. 3 shows a flow chart of a method to provide for exceptions to outbound message restrictions used in the two-way messaging system, in accordance with the preferred embodiment of the present invention.

Referring to FIG. 3, a flow chart of a method to provide for exceptions to outbound message restrictions used in the two-way messaging system 100 is shown, in accordance with the preferred embodiment of the present invention. In certain cases, subscribers may wish to exclude certain types of messages from a restrictions placed on outbound messages by the subscriber. In order to do so, the subscriber causes the selective call radio to transmit an exception command. When the messaging terminal 112 receives the exception command at step 305, the messaging terminal 112 stores the exception command in the subscriber database, at step 310. The exception command can specify one of several classes of message types that are to be excluded from outbound message restrictions. Message types include priority messages, numeric only messages, messages from identified sources, and messages that include identified words. Priority messages that meet the exception command are those that have a priority higher than a default priority or higher than a priority indicated with the exception command. Numeric messages of any length are excepted when the exception command is the numeric only exception command. Identified sources include such sources as all dial in messages, or all information messages from one identifiable source. Any word entered by the subscriber that is sent with an "exception command for messages that include an identified word" is used to test messages intended for the selective call radio on the channel on which the command was received.

Figure 4:
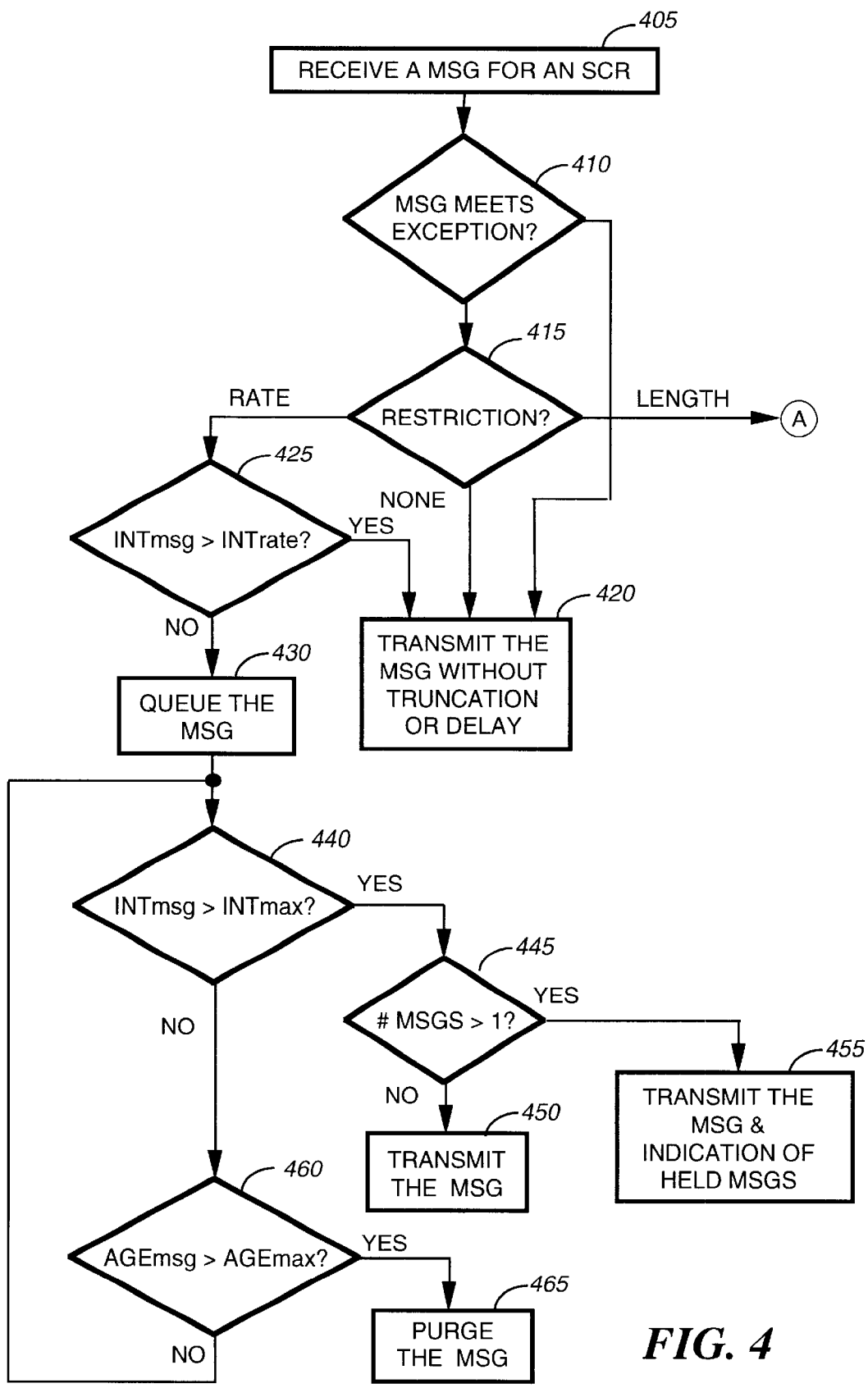
FIGS. 4 and 5 show a flow chart of a method to perform outbound message restrictions, in accordance with the preferred embodiment of the present invention.
Figure 5:
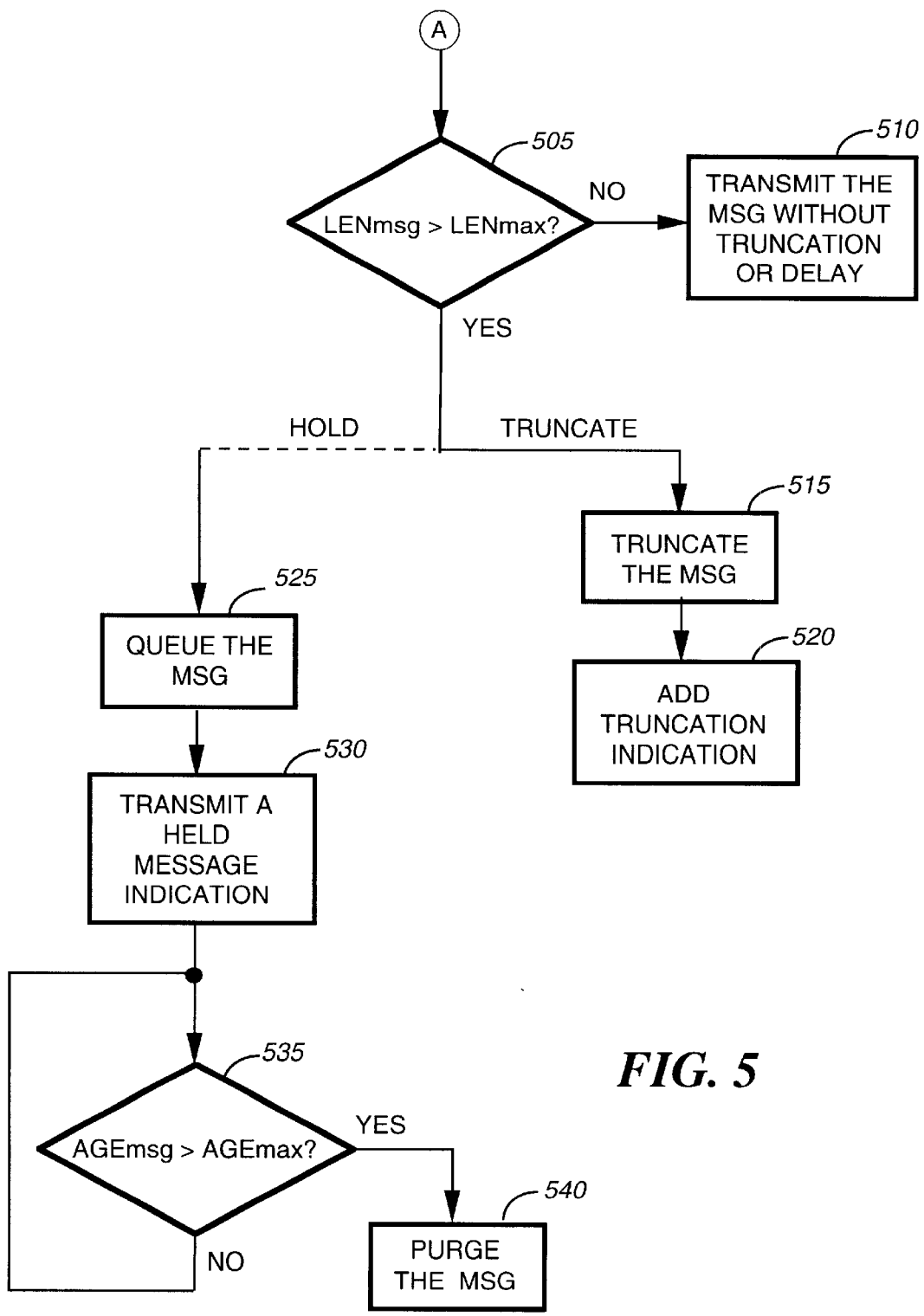
Figure 6:
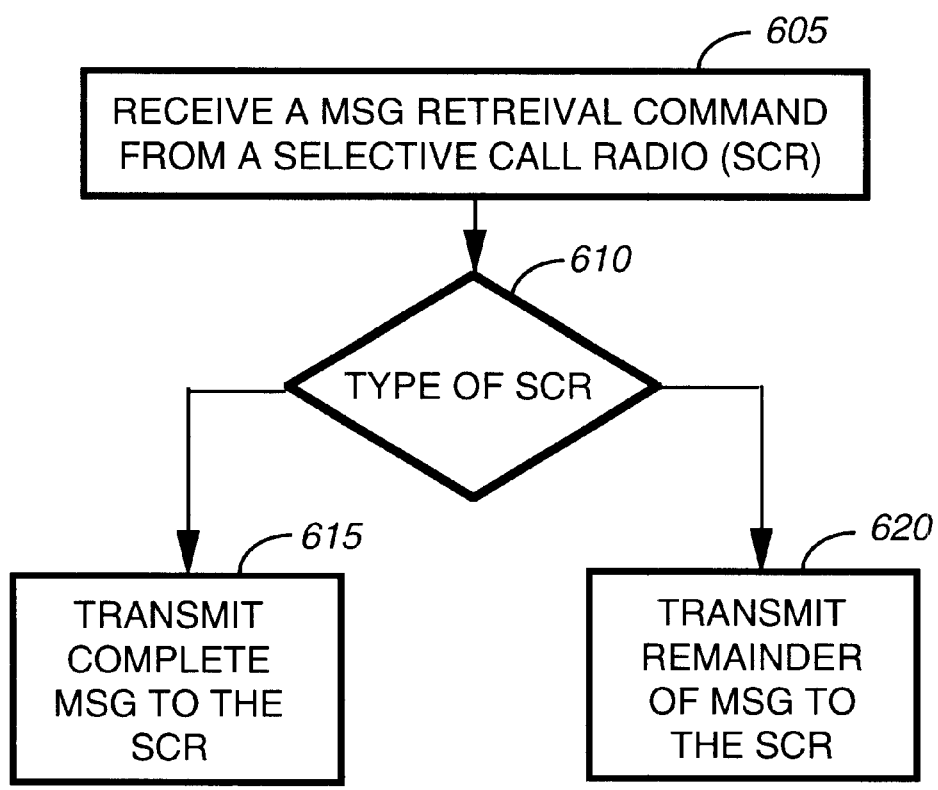
FIG. 6 shows a flow chart of a method of retrieving a message being held in queue by the messaging terminal, in accordance with the preferred embodiment of the present invention.

Referring to FIGS. 4 and 5, a flow chart of a method to perform outbound message restrictions is shown, in accordance with the preferred embodiment of the present invention. References to messages in the following descriptions of FIGS. 4, 5, and 6 are to outbound messages unless otherwise stated. When a message is received by the messaging terminal 112 from a message source, at step 405, the messaging terminal 112 identifies which selective call radio the message is intended for and on which channel it is to be transmitted (the channel determination typically depends on the source from which the message is received, but may depend on other factors). From the subscriber database, the messaging terminal 112 determines whether an exception command has been received from the select call radio for the channel in question. At step 410, the messaging terminal 112 determines whether the message meets the exception command. For example if the exception message is a priority exception for messages having priority higher than 2, then when the priority of a message is higher than 2, the exception is met and the message is transmitted without truncation or delay at step 420. When the exception is not met at step 415, then a determination is made by the messaging terminal whether a restriction command has been received for the selective call radio on the channel the message is to be transmitted, at step 420. When there is no such restriction, the message is transmitted without truncation or delay at step 420. When a rate restriction is determined to have been received at step 415, the messaging terminal 112 determines, at step 425 whether an interval that is measured from the time the last message was sent to the selective call radio on the channel to the present time, INTmsg, is greater than INTrate that has been established by the restriction command at step 210 (FIG. 2). When at step 425 INTmsg is greater than INTrate, the message is transmitted without truncation or delay at step 420. When INTmsg is not greater than INTrate at step 425, the message is placed in queue at step 430. INTmsg for messages in the queue are repetitively measured at step 440, and when INTmsg exceeds INTrate at step 440, a determination is made whether there are any other messages in the queue at step 445. When there are no other messages in the queue at step 445, the message is transmitted at step 450. When there are other messages in the queue at step 450, the oldest message is transmitted with an indication of how many other messages are in the queue, at step 455. In a variation of the present invention, an indicator that there are messages being held in queue is sent with any messages that are transmitted while messages are being held in queue, for example, the indicator is sent with a message that meets an exception at step 410.

When, at step 440, any messages in queue are not ready to be transmitted, an age of each message, AGEmsg, is determined. AGEmsg is the duration from the time the message for the selective call radio was originally received (in contrast to INTmsg, the interval from the transmission of the last message to the selective call radio). When AGEmsg exceeds AGEmax at step 460, the message is purged at step 465. Otherwise, messages remain in queue.

At step 415, when it is determined by the messaging terminal 112 that a message length restriction exists for the selective call radio on the channel on which a message is to be sent, then a determination is made at step 505 (FIG. 5) whether the length of the message, LENmsg, is greater than LENmax. When LENmsg is not greater than LENmax, then the message is transmitted without truncation or delay at step 510. When LENmsg is greater than LENmax, then, in accordance with the preferred embodiment of the present invention, the message is truncated at step 515 and the truncated message is transmitted at step 520, with an indication in the message that it has been truncated, and by how much. The indication of how much can be an indication of the length of the remainder or the total length of the message.

In accordance with an alternative embodiment of the present invention, when LENmsg is greater than LENmax, the message is not truncated, but held by being placed in queue at step 525, and a indication that the message is being held is transmitted at step 530. This indication can be sent in a unique message at the time the message is placed in queue, or can be included with a later message that is not restricted from transmission. The age of the message, AGEmsg, is repetitively tested at step 535, and the message is purged at step 540 when AGEmsg exceeds AGEmax, a value previously established by the subscriber or by default, as determined by system setup or design parameters.

Referring to FIG. 6, a flow chart of a method of retrieving a message being held in queue by the messaging terminal 112 is shown, in accordance with the preferred embodiment of the present invention. When an outbound message is held in queue at step 525 (FIG. 5), or alternatively is transmitted in a truncated manner at step 515, the subscriber can retrieve the truncated or held message by sending a message retrieval command. When the message retrieval command is received at step 605, the messaging terminal 112 determines a characteristic of the selective call radio at step 610. When the selective call radio is determined from the characteristic to be a type of selective call radio that receives a remainder of a message, and the two-way messaging system 100 is of the type that truncates messages, then the remainder of a truncated message is sent to the selective call radio at step 615, and the selective call radio appends the remainder to the truncated message and presents it to the subscriber. When the two-way messaging system 100 does not truncate messages, or when the retrieval command is in response to a message held because of a rate restriction (at step 425, FIG. 4), the messaging terminal 112 sends the entire original message, without truncation.

It will be appreciated that in another alternative embodiment, both message truncation and message rate restrictions can be used. In two-way messaging systems 100 that truncate messages when they exceed the length restriction, the messaging terminal 112 first checks LENmsg and performs truncation as necessary (steps 505, 510, 515, 520, FIG. 5), then checks INTmsg and queues the message as necessary (at steps 425, 420, 430–465, FIG. 4). In two-way messaging systems 100 that hold messages when they exceed the length restriction, the messaging terminal 112 holds the message when either LENmsg exceeds LENmax or INTmsg exceeds INTrate.

By now it should be appreciated that a method is provided that allows a subscriber to control subscriber costs that are related to the length and number of messages received by the subscriber's two way selective call radio, wherein the subscriber can independently control the restrictions on different radio channels and allow for exceptions to the restrictions for important messages. In contrast to prior art methods, the method in accordance with the preferred embodiment of the present invention allows the subscriber to establish a message rate restriction and specifically allows the subscriber to dynamically modify the restrictions by sending messages from the selective call radio.

What is claimed is:

1. A method for controlling outbound messages in a two-way communication system, comprising in a system controller the steps of:

receiving from a selective call radio a restriction command applicable to outbound messages intended for transmission on a channel, wherein the restriction command is a maximum message storing the restriction command;

transmitting messages on the channel that are intended for the selective call radio according to the stored restriction command, wherein the system controller truncates the messages that are longer than the maximum message length; and receiving an exception command for a class of messages, wherein in the step of transmitting, the system the controller does not truncate the messages that are in the class of messages.

2. The method according to claim 1, wherein in the step of receiving an exception command and the step of transmitting, the class is one of the classes of priority messages, numeric-only messages, messages from identified sources, and messages that include identified words.

3. A method for controlling outbound messages in a two-way communication system, comprising in a system controller the steps of:

receiving from a selective call radio a restriction command applicable to outbound messages intended for transmission on a channel, wherein the restriction command is a maximum message length;

storing the restriction command;

transmitting messages on the channel that are intended for the selective call radio according to the stored restriction command, wherein the system controller truncates the messages that are longer than the maximum message length, wherein an indication of an amount of message truncation is included in a truncated message.

4. A method for controlling outbound messages in a two-way communication system, comprising in a system controller the steps of:

receiving from a selective call radio a restriction command applicable to outbound messages intended for transmission on a channel, wherein the restriction command is a maximum message length;

storing the restriction command;

transmitting messages on the channel that are intended for the selective call radio according to the stored restriction command, wherein the system controller truncates the messages that are longer than the maximum message length, wherein an indication of an untruncated message length is included in a truncated message.

5. A method for controlling outbound messages in a two-way communication system, comprising in a system controller the steps of:

receiving from a selective call radio a restriction command applicable to outbound messages intended for transmission on a channel, wherein the restriction command is a maximum message length;

storing the restriction command;

transmitting messages on the channel that are intended for the selective call radio according to the stored restriction command, wherein the system controller holds any of the messages that are longer than the maximum message length; and purging, on a periodic basis, the messages that have been held.

6. A method for controlling outbound messages in a two-way communication system, comprising in a system controller the steps of:

receiving from a selective call radio a restriction command applicable to outbound messages intended for transmission on a channel, wherein the restriction command is a maximum message length;

storing the restriction command;

transmitting messages on the channel that are intended for the selective call radio according to the stored restriction command, wherein the system controller holds any of the messages that are longer than the maximum message length, wherein the system controller further notifies the selective call radio of an amount of the messages that are held because they are longer than the maximum message length.

7. A method for controlling outbound messages in a two-way communication system, comprising in a system controller the steps of:

receiving from a selective call radio a restriction command applicable to outbound messages intended for transmission on a channel, wherein the restriction command is a maximum message rate;

storing the restriction command; and transmitting messages on the channel that are intended for the selective call radio according to the stored restriction command, wherein the system controller holds a number of the messages sufficient to achieve a message transmission rate that is less than or equal to the maximum message rate.

8. The method according to claim 7, further comprising the step of receiving an exception command for a class of messages, wherein in the step of transmitting, the system controller does not hold the messages that are in the class of messages.

9. The method according to claim 8, wherein in the step of receiving an exception command and the step of transmitting, the class is one of the classes of priority messages, numeric-only messages, messages from identified sources, and messages that include identified words.

10. The method according to claim 7, wherein the step of transmitting further comprises the step of notifying the selective call radio of the number of the messages held.

11. The method according to claim 7, further comprising the step of:

purging, on a periodic basis, the messages that have been held.

12. A method for controlling outbound messages in a two-way communication system, comprising in a system controller the steps of:

receiving from a selective call radio a restriction command applicable to outbound messages intended for transmission on a channel;

storing the restriction command;

transmitting messages on the channel that are intended for the selective call radio according to the stored restriction command;

transmitting a tariff change message intended for the selective call radio that indicates a tariff change duration, after the step of receiving from a selective call radio the restriction command; and receiving a restriction override command automatically transmitted from the selective call radio in response to receipt of the tariff change message, when an tariff change option has been selected in the selective call radio, wherein in the step of transmitting messages, the messages are transmitted with a predetermined default restriction for the tariff change duration.

13. A method for controlling outbound messages in a two-way communication system, comprising in a system controller the steps of:

receiving from a selective call radio a restriction command applicable to outbound messages intended for transmission on a channel;

storing the restriction command;

transmitting messages on the channel that are intended for the selective call radio according to the stored restriction command; and transmitting an indication of the restriction command to a message source.

* * * * *